(12) United States Patent
Ridder

(10) Patent No.: US 12,404,657 B2
(45) Date of Patent: Sep. 2, 2025

(54) SELF-PROPELLED EARTH WORKING MACHINE HAVING A JOYSTICK WITH MORE THAN ONE OPERATING MODE FOR CONTROLLING THE TRAVEL MOVEMENT

(71) Applicant: Wirtgen GmbH, Windhagen (DE)

(72) Inventor: Marc Ridder, Vettelschoß (DE)

(73) Assignee: Wirtgen GmbH, Windhagen (DE)

( * ) Notice: Subject to any disclaimer, the term of this patent is extended or adjusted under 35 U.S.C. 154(b) by 85 days.

(21) Appl. No.: 18/594,055

(22) Filed: Mar. 4, 2024

(65) Prior Publication Data

US 2024/0318407 A1    Sep. 26, 2024

(30) Foreign Application Priority Data

Mar. 14, 2023    (DE) .................. 10 2023 106 316.2

(51) Int. Cl.
*E02F 9/22*    (2006.01)
*E02F 9/20*    (2006.01)

(52) U.S. Cl.
CPC .......... *E02F 9/2253* (2013.01); *E02F 9/2004* (2013.01)

(58) Field of Classification Search
CPC .............................. E02F 9/2253; E02F 9/2004
See application file for complete search history.

(56) References Cited

U.S. PATENT DOCUMENTS

| | | | | |
|---|---|---|---|---|
| 7,106,300 B2* | 9/2006 | Saylor | ................ | G02B 21/365 345/161 |
| 7,942,604 B2* | 5/2011 | Willis | .................. | B62D 7/026 404/85 |
| 10,131,350 B2 | 11/2018 | Newendorp et al. | | |
| 11,884,320 B1* | 1/2024 | Brown | ................ | B62D 11/003 |
| 2014/0100743 A1 | 4/2014 | Foster et al. | | |

FOREIGN PATENT DOCUMENTS

| | | |
|---|---|---|
| DE | 102016220005 A1 | 4/2017 |
| JP | 2019049115 A | 3/2019 |

OTHER PUBLICATIONS

European Patent Office Search Report for corresponding patent application No. 24162648.0, dated Aug. 16, 2024, 8 pages (not prior art).

* cited by examiner

*Primary Examiner* — Aryan E Weisenfeld
(74) *Attorney, Agent, or Firm* — Lucian Wayne Beavers; Patterson Intellectual Property Law, PC

(57) ABSTRACT

A self-propelled earth working machine includes a joystick deflectable from a reference position. A controller is configured to detect the deflection of the joystick and to control a travel drive. The controller is switchable between a first operating mode, in which the controller assigns a first movement variable to the deflection of the joystick according to a first correlation and controls the travel drive according to the first movement variable, and a second operating mode in which the controller assigns a second movement variable differing from the first movement variable to the deflection of the joystick according to a second correlation and controls the travel drive in accordance with the second movement variable but not in accordance with the first movement variable.

17 Claims, 8 Drawing Sheets

Figure 1:
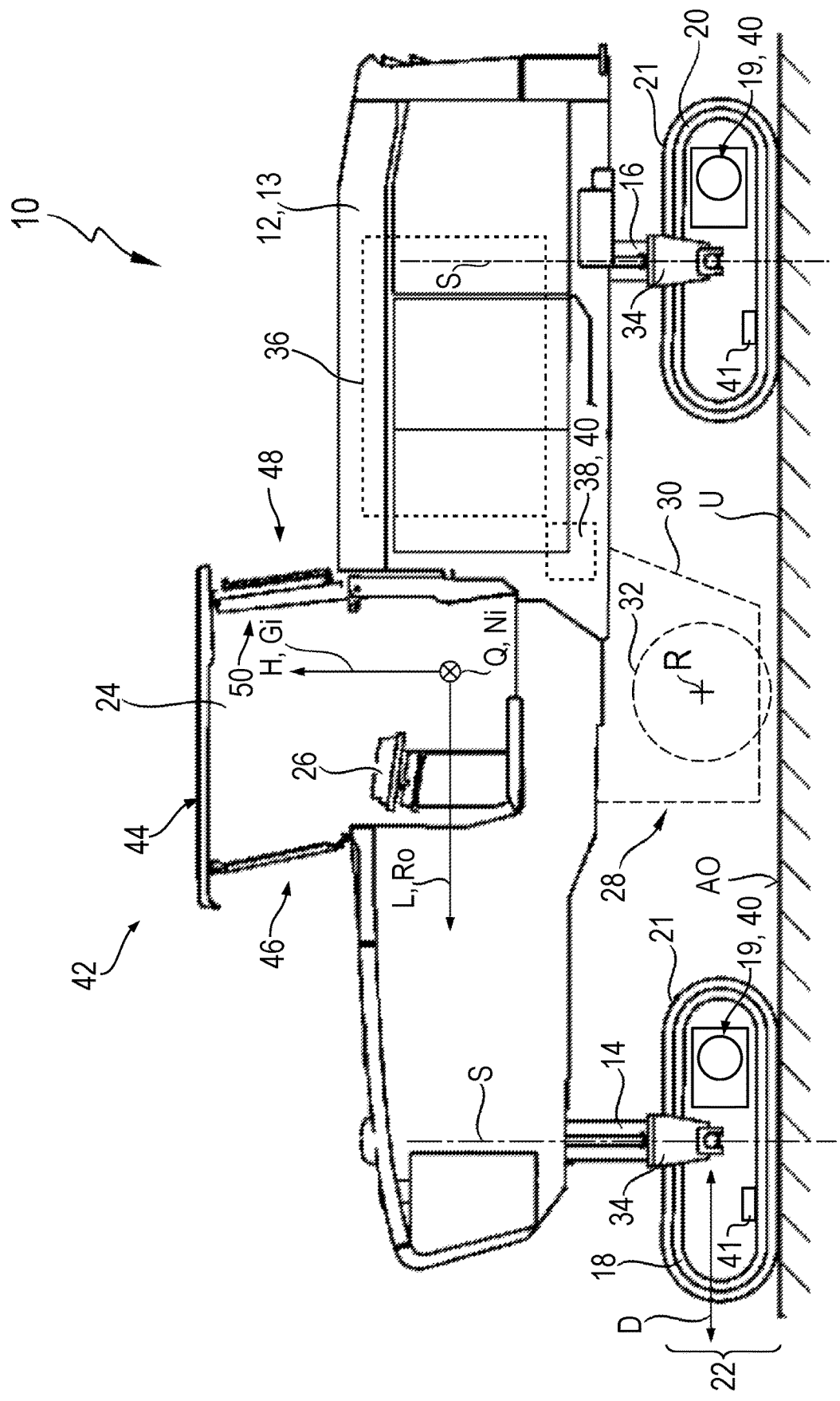

SELF-PROPELLED EARTH WORKING MACHINE HAVING A JOYSTICK WITH MORE THAN ONE OPERATING MODE FOR CONTROLLING THE TRAVEL MOVEMENT

RELATED APPLICATIONS

The present application claims priority to German Patent Application Ser. No. DE 10 2023 106 316.2 filed on Mar. 14, 2023, which is incorporated herein by reference.

BACKGROUND OF THE DISCLOSURE

Field of the Disclosure

The present application relates to a self-propelled earth working machine, comprising:
machine frame,
an earth working apparatus supported by the machine frame,
a traveling gear supporting the machine frame,
a travel drive for driving the earth working machine to perform a travel movement in a moving direction, and
an operating apparatus for controlling the travel drive, wherein the operating apparatus comprises a joystick deflectable from a reference position and a controller, wherein the controller is designed to detect a deflection of the joystick with respect to the reference position and to control the travel drive in accordance with the detected deflection in order to produce a travel movement.

DESCRIPTION OF THE PRIOR ART

In self-propelled earth working machines, in particular in those for earth removal work, travel levers are known as joysticks, which can be deflected in inclining fashion from a neutral position, wherein the controller interprets the direction of the deflection as indicating the travel direction desired by the machine operator and interprets the magnitude of the deflection as a desired target travel speed in the sense that a greater deflection corresponds to a higher desired target travel speed than a lesser deflection.

A disadvantage of this operating mode, according to which the controller drives the earth working machine in accordance with the deflection of the joystick in order to reach the target travel speed, is that the joystick must be held in the desired deflected position during the entire travel operation, since a reduction or increase in the magnitude of the deflection means a change of the desired target travel speed, which normally means a change in the actual travel speed.

Especially for earth working machines having more than one full-fledged operator station for controlling the travel of the earth working machine and thus having more than one joystick, this is problematic when the machine operator wants to change operator stations on the already traveling earth working machine.

Furthermore, self-propelled earth working machines are known having a travel lever as a joystick, which can be deflected from a neutral position, wherein the controller interprets the direction of the deflection as indicating the travel direction desired by the machine operator and interprets the magnitude of the deflection as a desired target travel acceleration in the sense that a greater deflection corresponds to a higher desired target travel acceleration than a lesser deflection.

In the latter functionality of the joystick, the travel speed of the earth working machine is changed for as long as the joystick is deflected from its neutral position, that is, with the travel acceleration corresponding to the magnitude of the deflection. A deflection direction of the joystick opposite to the current moving direction accordingly produces a deceleration as a negative travel acceleration.

This has the advantage that the joystick only needs to be actuated for changing an attained travel state, so that, if the earth working machine is to travel a longer distance in a uniform movement, the joystick no longer has to be actuated once the desired uniform movement is attained.

Furthermore, using a travel control, in which the extent of a deflection of the joystick corresponds to the magnitude of the travel acceleration by the travel drive, it is also possible to control the travel operation of machines having multiple operator stations from any operator station, an already traveling earth working machine allowing the machine operator to move from one operator station to another operator station without changing the travel state, in particular the travel speed. Such travel controls are implemented in large road milling machines, for example, which have an operator's platform with more than one operator station. The operator stations are situated at a distance from one another in the transverse machine direction, so that from his chosen operator station the machine operator is able to monitor the earth working operation of the machine either near the right edge or near the left edge of the machine relative to the direction of travel.

A disadvantage of this second travel control concerns starting the travel of the earth working machine from standstill, since human beings, and thus also machine operators, generally have no natural sense for travel acceleration and thus a controlled travel start-up is possible only with difficulty, especially when the earth working apparatus is simultaneously in working engagement with the ground with a reactive force that varies greatly depending on the travel speed provided by the travel drive. The attained travel speed depends in a less than intuitive manner on the duration of the actuation of the joystick.

SUMMARY OF THE DISCLOSURE

Hence, the disclosure described in the present application is based on the technical objective of facilitating a control of a travel operation of an earth working machine, without thereby complicating the operating devices.

The present disclosure achieves this objective in an earth working machine of the kind mentioned at the outset in that the controller is switchable between a first operating mode, in which the controller assigns a value of a first movement variable to the deflection angle of the joystick in a first direction of deflection about a first axis of deflection irrespective of any deflection of the joystick orthogonal to the first direction of deflection according to a first correlation and controls the travel drive in accordance with the first movement variable, and a second operating mode, in which the controller assigns a value of a second movement variable differing from the first movement variable to the deflection angle of the joystick according to a second correlation and controls the travel drive in accordance with the second movement variable, wherein the controller in the second operating mode does not control the travel drive according to the first correlation in accordance with the first movement variable.

Because the controller is switchable between the first and the second operating mode, a single joystick at an operator station continues to suffice in order to control a travel operation of the earth working machine. Depending on whether the machine operator prefers controlling the travel drive via the controller in accordance with the first movement variable or in accordance with the second movement variable, a changeover of the controller between the mentioned operating modes is able to activate the operating mode regarded as more suitable. As will be described in detail further below, the selection or activation of the most suitable operating mode may also occur without contribution from the machine operator according to objective criteria of the respective operating situation of the travel drive and/or of the actuation situation of the joystick.

The earth working machine may be any earth working machine, for example a material-applying earth working machine, such as a road paver, or a material-removing earth working machine, such as a road milling machine, a recycler or a surface miner. The earth working apparatus of the earth working machine is preferably designed for material-removing earth work. Normally, the earth working apparatus comprises a material-removing drum such as a milling drum or cutting drum, for example. As a milling drum, the material-removing drum comprises milling bits as removal tools, while as a cutting drum, the material-removing drum comprises cutting disks as removal tools. In the earth working apparatus, the material-removing drum is preferably rotatable about a drum axis extending in the transverse machine direction. For reasons of operational safety, the material-removing drum is preferably accommodated and enclosed in a drum box, known per se, that is open toward the ground to be worked.

The traveling gear comprises a plurality of rollable drive units. Individual or all drive units may be wheel drive units or crawler drive units. Preferably, two drive units, which form a common traveling gear axle due to their position in a common longitudinal area of the earth working machine, are drive units of the same kind, that is, either both wheel drive units or both crawler drive units. Preferably, all drive units of the traveling gear are drive units of the same kind.

The travel drive may be a hydraulic drive, which has proven reliable in earth working machines, each drive unit of the traveling gear preferably having its own drive motor. The travel drive may also be an electric drive, however, each drive unit of the traveling gear again preferably having its own drive motor. It is likewise possible that only a subset of the drive units existing in the traveling gear is driven, each drive unit of the subset having its own drive motor, and that the remaining drive units as trailing drive units roll off on their contact areas merely passively, driven by the driven drive units.

The machine frame is preferably disposed so as to be vertically adjustable relative to the drive units, for example by lifting columns, which connect the machine frame to the drive units. It is possible that only the drive units of one traveling gear axle are connected to the machine frame by lifting columns, while drive units of another traveling gear axle are connected to the machine frame without the latter being vertically adjustable. Equally, all drive units of the traveling gear may be connected to the machine frame by lifting columns. The lifting columns may be hydraulically and/or electromechanically and/or pneumatically adjustable in their longitudinal dimension extending along the vertical machine direction and thereby allow for a vertical displacement of the machine frame relative to the drive units.

An operator's platform having at least one operator station is situated on the machine frame, from which a machine operator is able to control the operation, in particular also the travel operation, of the earth working machine.

In general, the possibility of switching the controller between two, in particular at least two, operating modes is advantageous, regardless of which different movement variables are used as the first and the second movement variable. This offers the possibility of driving the movement of the earth working machine using one and the same joystick in accordance with two different control characteristics.

According to the introductory explanations, the first movement variable preferably comprises or is a target travel speed of the earth working machine. The extent of the deflection thus specifies a target travel speed of the earth working machine that is desired by the machine operator and that is therefore to be attained. The desired travel direction can preferably be set by the direction of the deflection. A deflection of the joystick in the forward travel direction sets the earth working machine in motion in the forward travel direction. The same is true—mutatis mutandis—for the deflection of the joystick in the reverse travel direction.

In this context, a greater magnitude of the deflection of the joystick indicates a greater target travel speed to be reached by the earth working machine and a lesser magnitude of the deflection of the joystick indicates a lesser target travel speed to be reached by the earth working machine.

The relationship between the magnitude of the deflection of the joystick and the magnitude of the respectively assigned target travel speed is defined by the first correlation. The first correlation may be stored in a data memory of the controller, for example as a characteristics map, characteristic curve, formulaic relationship, look-up table and the like. The first correlation, however, may be defined additionally or alternatively by the respective embodiment of the joystick in terms of construction or installation, for example in that the joystick by its deflection actuates an electrical actuator, such as a potentiometer for example, which outputs an electric variable, the magnitude of which is a function of the respective actuation position or deflection of the electrical actuator.

The relationship between the magnitude of the deflection of the joystick and the magnitude of the respectively assigned target travel speed may be a linear relationship, which is particularly intuitive for machine operators. The relationship may also be a progressive or degressive relationship, however, according to which, starting from a reached magnitude of deflection, an increase or reduction by a specific number of percentage points relative to 100% maximum deflection results in an increase or reduction by a greater number of percentage points (progressive) or in an increase or reduction by a lesser number of percentage points (degressive) of the target travel speed.

The earth working machine preferably has at least one speed sensor, which detects the current actual travel speed of the earth working machine and outputs it to the controller, so that the controller by comparing the desired target travel speed indicated by the deflection of the joystick and the actual travel speed detected by the at least one speed sensor is able to recognize when no further travel acceleration or deceleration is necessary because the actual travel speed corresponds to the target travel speed with sufficient accuracy.

Likewise preferably, the second movement variable according to the introductory explanations may comprise or be a target travel acceleration or an operating variable of the earth working machine, in particular of the travel drive, that stands in a causal relationship with the travel acceleration of the earth working machine.

Generally, earth working machines do not have an acceleration sensor, so that the controller is not able to control the travel drive directly in regulating fashion by comparing an actual travel acceleration with a target travel acceleration. Rather, the controller directly controls apparatuses that influence the travel acceleration produced by the travel drive. For example, in the case of an electric travel drive, the controller may control an electrical variable supplied to the respective electric motor such as, for example a motor current. For this purpose, it is not necessary for the controller itself to output the electrical variable supplied to the electric motor directly, but rather it may control greater electrical variables such as voltages and/or currents, in particular the mentioned motor current, via a lesser electrical control signal, such as for example a control current and/or a control voltage, output to electrical circuit components such as thyristors and/or diodes. As a result, by taking into account the respective operating characteristics of the electrical components involved including the electric travel drive, a greater magnitude of deflection of the joystick will result in a greater magnitude of the target travel acceleration and vice versa. The same holds true for other drive types.

Thus, it is possible for example that the controller outputs a control signal varying linearly with the magnitude of the deflection of the joystick, which also produces a linear change of a drive force or a drive torque output by the travel drive. However, since losses, such as friction losses and flow losses, in the drive train may depend in their magnitude on the current travel speed and must be compensated by the output drive force or drive torque, it is possible that, in spite of a linear behavior of the controller and even of the travel drive in relation to the magnitude of the deflection of the joystick, the effectively produced travel acceleration of the earth working machine does not exhibit a linear relationship with the magnitude of the deflection of the joystick.

In the case of a hydraulic drive, which is common in many earth working machines at the time of the present application, the controller can output a, preferably electrical, signal, the signal strength of which, such as voltage and/or current strength, is a function of the deflection of the joystick. In a manner known per se, the electrical signal effects an actuation of at least one hydraulic component for changing a mass flow of a hydraulic medium in the hydraulic circuit of the travel drive and/or for changing a displacement of a hydraulic drive motor or a hydraulic drive pump. As a result, taking into account the operating characteristics of the components involved, a change of the travel acceleration of the earth working machine is achieved as a function of the deflection of the joystick.

For example, as a function of the deflection of the joystick, the controller may output a control current of 0 to 1 A, preferably of 100 to 900 mA, particularly preferably of 200 to 600 mA, and thereby control a further electrical component as a function of the intensity of the output signal current.

For clarification, it should be noted that when using a target travel speed as the first movement variable, then, if at the same time the actual travel speed deviates from the target travel speed, a travel acceleration of the earth working machine is indispensable in order to reach, starting from the actual travel speed, the target travel speed indicated by the deflection of the joystick.

Here it is advantageous if differences of lesser magnitude between the actual travel speed and the target travel speed are overcome by travel accelerations of lesser magnitude rather than of greater magnitude. Especially when starting from an actual travel speed of 0 m/min, that is, starting from the standstill of the earth working machine, in the preferred embodiment the earth working machine is accelerated with lesser travel accelerations to lesser target travel speeds and is accelerated with greater travel accelerations to greater target travel speeds. Ultimately, this means that in the first operating mode, in the mentioned example, the deflection of the joystick represents not only directly a desired target travel speed, but indirectly also a target travel acceleration to be set in order to reach the desired target travel speed. Hence, as already indicated above, it cannot be ruled out that in the first operating mode the controller controls the travel drive not only in accordance with the first movement variable, but also in accordance with the second movement variable.

Likewise, in the second operating mode, by accelerating the earth working machine in accordance with the deflection of the joystick, a speed of the earth working machine is always unavoidably reached. In contrast to the first operating mode, however, the speed reached by the earth working machine in the second operating mode depends not only on the deflection of the joystick, but also on the duration of the deflection. In fact, the controller controls the travel drive to accelerate the travel of the earth working machine in the direction indicated by the direction of the deflection either until the deflection of the joystick has ended or until a maximum speed is reached or, in the event of a travel acceleration directed counter to the current direction of travel, until the earth working machine comes to a standstill. In principle, it would be conceivable that in an initially negative travel acceleration, the earth working machine is initially decelerated and, if the deflection is continued, an acceleration is implemented in the opposite direction until the deflection has ended or until the maximum speed is reached. For reasons of improved operational safety, however, a travel acceleration of the earth working machine counter to its current moving direction (deceleration) even with a continued deflection of the joystick is preferable only until the earth working machine comes to a standstill, but not beyond.

The maximum speed reachable in the second operating mode may be a maximum speed inherently predetermined by the construction of the earth working machine. This is then the maximum speed at which all components involved in the movement of the earth working machine together effect a deceleration by friction and the like, which corresponds in magnitude to the travel acceleration produced by the travel drive, so that there is a balance between the travel drive and the travel resistance.

For reasons of operational safety, however, it is not preferable to accelerate the earth working machine to a speed, which would be only structurally determined by the components used in the earth working machine and which would thus differ from one earth working machine to another earth working machine due to the different manufacturing tolerances.

Preferably, in the second operating mode, a maximum speed below the structurally determined maximum speed is therefore defined, starting at which the earth working machine is not accelerated further in the second operating mode. The earth working machine preferably comprises at least one speed sensor, also for the purpose of checking whether the maximum speed specified by the controller has been reached, in order to detect the respective travel speed of the earth working machine and to transmit it to the controller. The maximum speed specified by the controller, however, is preferably independent of the deflection of the joystick, so that the controller in the second operating mode preferably does not control the travel drive in accordance with a combination of deflection of the joystick and the first movement variable.

In a less preferred specific embodiment, but one that still falls under the present disclosure, the controller in the second operating mode is able to assign a value of a first movement variable to the detected deflection of the joystick according to a further correlation and control the travel drive also in accordance with the first movement variable. The further correlation then differs from the first correlation. In this connection, it would be conceivable, for example, to change in the second operating mode the achievable maximum speed to a certain extent, in particular slightly, for example no more than ±10% about a preset maximum speed, as a function of the deflection of the joystick.

Although the earth working machine is preferably steerable, the directions of movement or drive directions inputtable by the joystick, in which the controller is to control the travel drive for moving the earth working machine, is preferably limited to the opposite directions of "forward" and "reverse". In general, a steering angle plays no role as a control input for the travel drive of drive units of the traveling gear. For reasons of operational safety, however, the maximum speed and/or the maximum achievable acceleration may be reduced to a lesser value as a function of the steering angle than in the case of straight-ahead travel without steering angle. The maximum speed specified in terms of control engineering in the second operating mode may be different, preferably higher, than for reverse travel. Likewise, the first and/or the second correlation may differ for forward travel and reverse travel.

As was described in detail above with reference to the example of the target travel speed as the first movement variable and the target travel speed as the second movement variable, the controller may consequently quite generally assign in the first operating mode a value of the second movement variable to the deflection of the joystick according to a third correlation and control the travel drive also in accordance with the second movement variable.

In general, the third correlation may be a separate correlation, different from the first and/or second correlation, which is used only in the first operating mode for example. For machine operators, who control the travel operation of the earth working machine both in the first as well as in the second operating mode, it has proven advantageous for the intuitive operability of the operating apparatus, if the third correlation is the second correlation. In the case where the second movement variable is the target travel acceleration or an operating variable causally related to the travel acceleration of the earth working machine, in particular of the travel drive, a deflection of the joystick of equal magnitude produces a travel acceleration of equal magnitude in both operating modes of the first and second operating mode.

In principle, it is conceivable that a switch, referred to below as a "changeover switch" that can be actuated independently of the joystick, is located at an operator station, possibly even on the joystick itself, which by its specific actuation allows a machine operator to switch the controller over between the first and the second operating modes. Observations of earth working machines in operation have shown, however, that a travel control in the first operating mode is advantageous for very specific operating situations, and that a travel control in the second operating mode is advantageous for other very specific operating situations. The operating situations are specifically travel operating situations, which are brought about by the joystick and its actuation itself. For the purpose of relieving the machine operator, it is therefore advantageous if the controller is designed to end the first operating mode as a function of the actuation state of the joystick by a movement of the joystick and to begin controlling the travel drive in the second operating mode by the same or another movement of the joystick.

In the preferred case of the target travel speed as the first movement variable, controlling the travel in the first operating mode is advantageous especially when starting to move the earth working machine from standstill. Once the earth working machine has reached a target travel speed desired by the machine operator, it is preferable to control the travel in the acceleration-related second operating mode. For at that time, often only small corrections of the travel speed are necessary, which in the acceleration-related second operating mode can be achieved by occasional brief actuations of the joystick.

It shall not be precluded, however, that in addition to the previously described automatic changeover from the first to the second operating mode as a function of the actuation state of the joystick by a movement of the joystick, the previously described changeover switch is present, in order for example to be able to maneuver the earth working machine independently of the actuation state of the joystick in one of the two mentioned operating modes, for example in the first operating mode, for example for the purpose of loading the earth working machine onto a transport vehicle.

It has proven to be intuitively and ergonomically particularly advantageous to use a movement of the joystick that changes the deflection of the joystick as the aforementioned movement, in particular the actuation of the joystick for ending the first operating mode, in particular for switching from the first to the second operating mode. Preferably, the change of the deflection of the joystick is of a magnitude greater than a predefined tolerance path or equal to a predefined tolerance path, in order to prevent a termination of the first operating mode, in particular a switch from the first to the second operating mode, as a result of unintended movements, triggered for example by vibrations or shocks on the machine, or at least to reduce the number of such unintended changeovers.

Following the termination of the first operating mode, the controller may proceed with controlling the travel drive in the second operating mode. Advantageously, the start of the control of the travel drive in the second operating mode may likewise depend on a movement, in particular an actuation, of the joystick that changes the deflection of the joystick. In order to be able to provide a defined initial state for starting the control of the travel drive in the second operating mode, the movement or actuation of the joystick, by which the first operating mode is ended, may differ from the movement or actuation by which a control of the travel drive in the second operating mode begins.

In principle, the movement or actuation of the joystick, which brings about a termination of the first operating mode, may be any movement of the joystick, for example a movement orthogonal to a movement or actuation that produces a drive in the forward travel direction or reverse travel direction. It has proven advantageous, however, if the movement of the joystick, which brings about a termination of the first operating mode, occurs in no other direction than the movement of the joystick producing a drive in the forward travel direction or reverse travel direction.

The controller is preferably designed to end the first operating mode when an already reached deflection of the joystick is reduced in magnitude. In the preferred case described above of a target travel speed as the first movement variable, this means that when the machine operator controls the travel drive by way of the joystick in the first operating mode and reduces a chosen deflection in terms of magnitude by at least a predetermined tolerance path, for example because the earth working machine has reached the target travel speed indicated in the first operating mode by the machine operator by a deflection of the joystick, the controller automatically ends the first operating mode. A consequence of the termination of the first operating mode is that a further change in the deflection of the joystick does not bring about a change in the travel state of the earth working machine according to the first correlation.

Following the end of the first operating mode, the deflection of the joystick is preferably disregarded by the controller until the joystick has reached a predetermined position, preferably the reference position. This makes it possible to ensure that a change of the travel state of the earth working machine on the basis of a deflection of the joystick occurs starting from the predetermined position, which is therefore preferably the reference position. Furthermore, it is not to be assumed that the machine operator, who has attained a desired travel state of the earth working machine in the first operating mode, by reducing the deflection by at least the tolerance path wishes to initiate a change of the travel state. This holds true especially as long as the deflection of the joystick continues to be reduced. In this situation, the machine operator will definitely not desire a control intervention of the controller on the basis of the deflection reduced at least by the tolerance path, but in accordance with the second correlation distinct from the first correlation. Even though such a development of the controller may in principle be comprised by the present disclosure, it would be hardly intuitive.

Starting with the return of the joystick to the predetermined position, preferably the reference position, and/or starting with a new change of the deflection of the joystick toward deflections that are greater in magnitude, the controller is able to control the travel drive in the second operating mode. For both a deflection of the joystick from the reference position as well as a reversal of the direction of movement of the joystick from a movement toward the reference position to a movement away from the reference position can indicate the intention of the machine operator to bring about a change of the travel state.

The machine operator is then able, for the time being, to control the travel drive of the earth working machine according to the second correlation by deflection of the joystick and thereby input, in particular by deflection of the joystick in the corresponding direction, the travel acceleration or deceleration of the earth working machine in the moving direction associated with the direction of the deflection.

In the context of the disclosure, it may be advantageous to allow the machine operator, having reached a local-maximum deflection in the first operating mode, to continue to correct the travel state of the earth working machine in the first operating mode or to continue to control the travel drive of the earth working machine within a specified limits in the first operating mode. For this purpose, the controller can define a correction range around a local-maximum deflection reached in the first operating mode, within which a change of the deflection of the joystick effects a control of the travel drive in the first operating mode. The reached local-maximum deflection may be detected by the controller by a stoppage or by a reversal of the direction of movement of the joystick.

Accordingly, a local-maximum deflection of the joystick is a joystick position reached during an actuation of the joystick with a magnitude of deflection that is not exceeded, without utilizing the maximum adjusting path of the joystick.

The correction range preferably comprises a first correction path starting from the reached local-maximum deflection and running in a direction away from the reference position. By adjusting the joystick within the correction range along the first correction path away from the reached local-maximum deflection, the machine operator is able to control the travel drive in the first operating mode.

The correction range may comprise a second correction path starting from the reached local-maximum deflection and running in a direction toward the reference position. By adjusting the joystick within the correction range along the second correction path in the direction away from the reached local-maximum deflection, the machine operator is able to control the travel drive in the first operating mode. In this context, the adjustments along the first and the second correction paths starting from a reached local-maximum deflection normally have the opposite effect, corresponding to their opposite adjustment directions. For example, a deflection of the joystick along the first correction path away from the reached local-maximum deflection may adjust the travel drive to higher speeds, while an adjustment of the joystick along the second correction path away from the reached local-maximum deflection adjusts the travel drive to lower speeds.

The first and the second correction paths may be of equal length or of different length. The first correction path may extend up to the maximum possible deflection of the joystick, but not beyond the maximum possible deflection, that is, beyond the maximum possible adjustment path of the joystick. The second correction path may extend up to the reference position, but preferably not beyond the reference position. Further preferably, the second correction path is not longer than the tolerance path, particularly preferably shorter than the latter. If the second correction path is shorter than the tolerance path, an adjustment of the joystick beyond the second correction path, but not beyond the tolerance path, preferably has no effect on the travel drive. It also does not end the first operating mode.

A deflection of the joystick starting from the reached local-maximum deflection beyond the first correction path preferably does not produce a change in the travel speed. Further optionally, the controller may also end the control of the travel drive in the first operating mode when the first correction path is exceeded. Thus, a departure from the correction range on the side of the first correction path in the direction away from the reference position may have the same effect on the control of the travel drive by the controller as an exceedance of the tolerance path when adjusting the joystick toward the reference position.

The first and/or the second correction path and/or the tolerance path may be an absolute distance or angular value of the deflection, which is stored in the data memory of the controller. The first and/or the second correction path and/or the tolerance path may be a proportional value to be applied to the deflection value of the reached local-maximum deflection in the first operating mode, for example a percentage such as 50%, 40%, 30%, 20%, 10%, 5% or 3%, for example, which is stored in the data memory of the controller. In the latter case, the first and/or the second correction path and/or the tolerance path depend on the magnitude of the reached local-maximum deflection.

The first correction path may always extend to the location of the maximum possible deflection. The first correction path may be zero, for example if beyond starting travel from standstill no enduring speed control in the first operating mode is desired.

In a preferred specific embodiment, the second correction path may be zero if the travel drive in the first operating mode is to be controlled only in one sense, for example toward higher travel speeds.

The machine operator may successively attain different deflections, which the controller is respectively able to detect by stoppage or by reversal of the movement of the deflected joystick. Particularly in the case of the last-mentioned preferred specific embodiment, whose correction range only has a first correction path and which therefore only extends from the respectively reached local-maximum deflection in the direction away from the reference position, temporally successive reached local-maximum deflections of the joystick are located increasingly further away from the reference position. A reduction of the magnitude of the deflection of the joystick starting from a reached local-maximum deflection by less than the tolerance path remains without effect on the travel drive and does not end the first operating mode. Only when the previously reached local-maximum deflection of the joystick in the direction away from the reference position is exceeded by less than the first correction path does the deflection of the joystick result by way of the controller in a change in the operating situation of the travel drive corresponding to the deflection of the joystick.

If successively multiple local-maximum deflections of the joystick are reached, each of these deflections preferably has its own correction range. The correction range can thus move along with the respectively reached local-maximum deflections, possibly while its size is adapted. Alternatively, the correction range may be defined and taken into consideration by the controller only at the first or at another predetermined reached local-maximum deflection.

To configure the earth working machine to match the abilities and preferences of the respective machine operator, the parameters defining the first and/or the second correction path and/or the tolerance path may be input into the controller by the machine operator. For this purpose, the controller may preferably comprise an input device.

The joystick preferably has a neutral position, the controller controlling the travel drive neither in an accelerating nor in a decelerating manner as long as the joystick is in the neutral position. Further preferably, the joystick is pretensioned in the direction of the neutral position and returns to the latter if the machine operator or another person or device exerts no actuation force or no actuation torque on the joystick. This facilitates the work of the machine operator considerably. This also facilitates the installation of multiple operator stations, each having a joystick designed to control the travel operation, which, in the event that the machine operator changes operator stations and does not engage with any joystick, are all equally in the neutral position. Further preferably, the neutral position is therefore the aforementioned reference position, relative to which the controller or at least one position sensor detecting a position of the joystick and cooperating with the controller ascertains the deflection with respect to magnitude and direction.

Having previously described the switch from the first to the second operating mode, the switch to the first operating mode, preferably from the second to the first operating mode, is described below:

In general, as already explained above, the changeover, in particular from the second operating mode, to the first operating mode by the aforementioned changeover switch may be performed deliberately by the machine operator. For the purpose of relieving the machine operator, the controller is preferably designed, additionally or alternatively, to end the second operating mode as a function of the travel state of the earth working machine and as a function of the actuation position or the deflection of the joystick and preferably to begin controlling the travel drive in the first operating mode. Such a change of operating modes on the part of the controller may be performed in automated fashion without deliberate actuation of the changeover switch on the part of the machine operator. Thus, following the termination of the second operating mode, the subsequent actuation of the joystick, in particular the subsequent deflection from the reference position, is able to control the travel drive in the first operating mode.

In the preferred case, in which the first operating mode is used for starting the earth working machine from standstill, the controller is preferably designed to start controlling the travel drive in the first operating mode when the earth working machine has a travel speed that is not greater than a predetermined threshold speed and when the joystick is in the neutral position. The predetermined threshold speed is preferably zero, that is, the earth working machine is at a standstill. For in that case any actuation of the joystick is a start-up of the travel of the earth working machine.

In principle, the controller may have more than the aforementioned first and second operating modes. For the actuation of the joystick for controlling the travel of the earth working machine to be quickly learnable and even intuitive, it is preferable, however, if the controller only has the first and the second operating modes, as were described and developed above.

A preferred application of the above-described operating apparatus is on an earth working machine having at least two joysticks, respectively deflectable from a reference position, which are situated at a spatial distance from one another. Each joystick preferably cooperates with the controller in order to control the travel drive in accordance with the detected deflection of one of the two joysticks so as to produce a travel movement. In principle, it is also conceivable that each joystick cooperates with a controller of its own. A set-up of one controller for all joysticks of the earth working machine is preferable, however, so that only one single controller controls the travel drive of the earth working machine, while this controller is able to receive input commands via multiple joysticks. In normal operation, even in the case of multiple existing joysticks, only one is actuated at a time, since the machine operator is only able to work at one operator station at a time.

In principle, it is conceivable within the scope of the presently presented disclosure that the operating state of the earth working apparatus is also taken into account in selecting the operating mode of the controller for controlling the travel movement, for example whether the earth working apparatus is currently in, particularly material-removing, engagement with the ground or not. So as not to overburden the machine operator, who gets used to a specific machine behavior when operating the machine, with an unnecessary high number of conditions for switching between the operating modes of the controller, the controller is preferably designed to select the first and/or the second operating mode as the active state independently of an operating state of the earth working apparatus.

The present earth working machine preferably transmits data via a data bus that has proven effective for vehicles, for example a CAN bus. Depending on the functioning method of the selected data bus, the controller may receive information via the data bus, for example sensor information, not continuously, but in a clocked manner. In such cases, the controller detects a position of the joystick with an uncertainty due to the clocking of the information transmission inherent in the system. Every position of the joystick mentioned in the present application is therefore to be understood as a disposition of the joystick within an uncertainty range around the mentioned position. In every direction of deflection of the joystick, the uncertainty range of the joystick may amount to, for example 1%, preferably 0.8%, of the maximum deflection path of the joystick in the respective direction.

If the joystick is pre-tensioned to move to the reference position, which is preferably the neutral position, a play of movement of the joystick at the reference position may set in over time. Any position of the joystick, which the joystick assumes as a result of being pre-tensioned without an external application of force on the part of the machine operator, is a reference position in the sense of the present application. Around its reference position, the joystick preferably has a play compensation range, out of which the joystick must first be moved, before the controller controls the travel drive based on the deflection of the joystick. In every direction of deflection of the joystick, the play compensation range may amount to, for example 1%, preferably 1.5%, of the maximum deflection path of the joystick in the respective direction.

BRIEF DESCRIPTION OF THE DISCLOSURE

Figure 2:
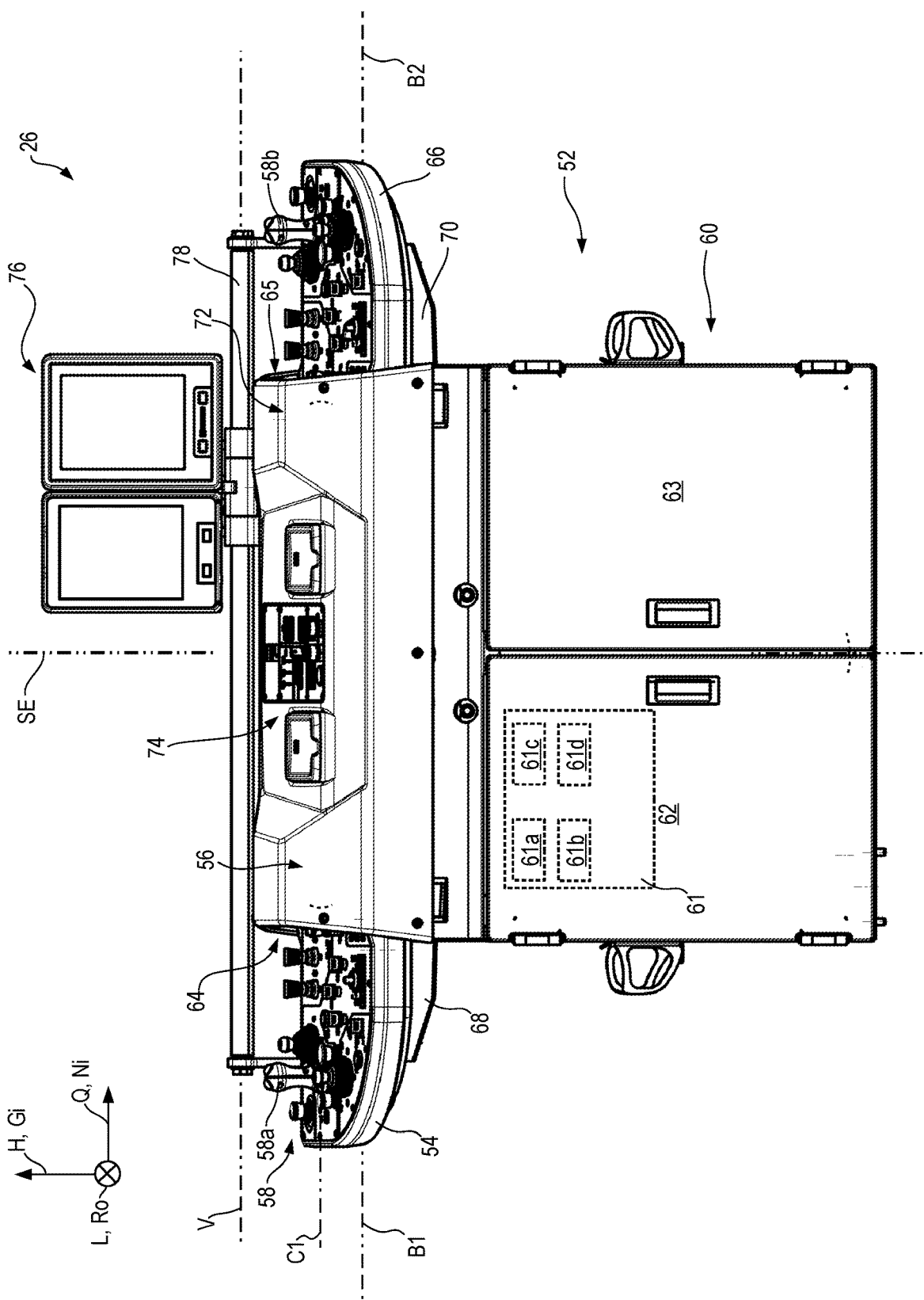
Figure 4:
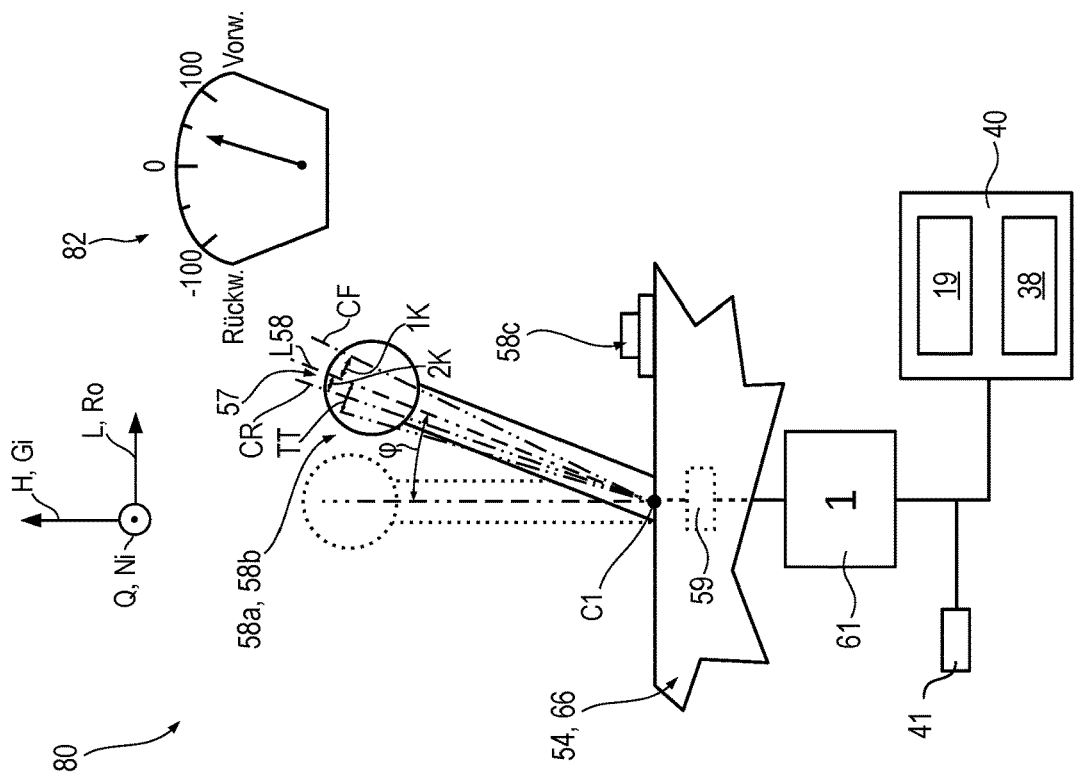
Figure 3:
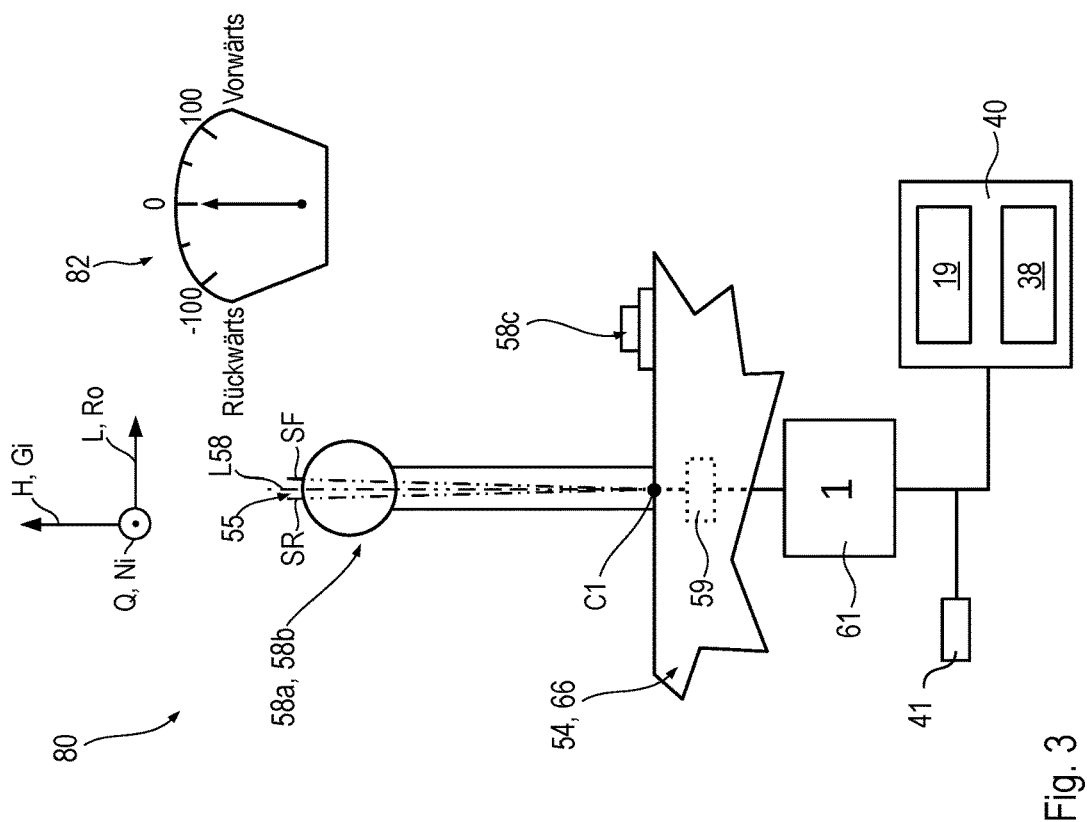
Figure 6:
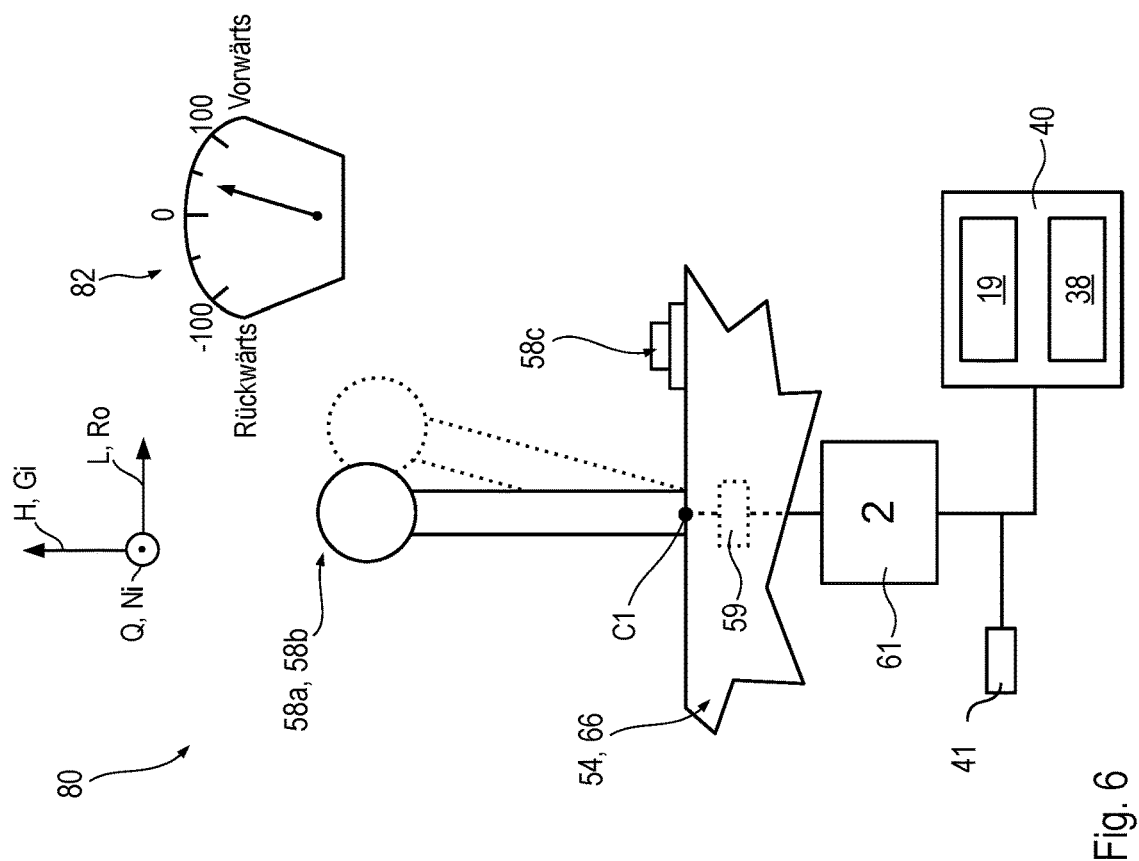
Figure 5:
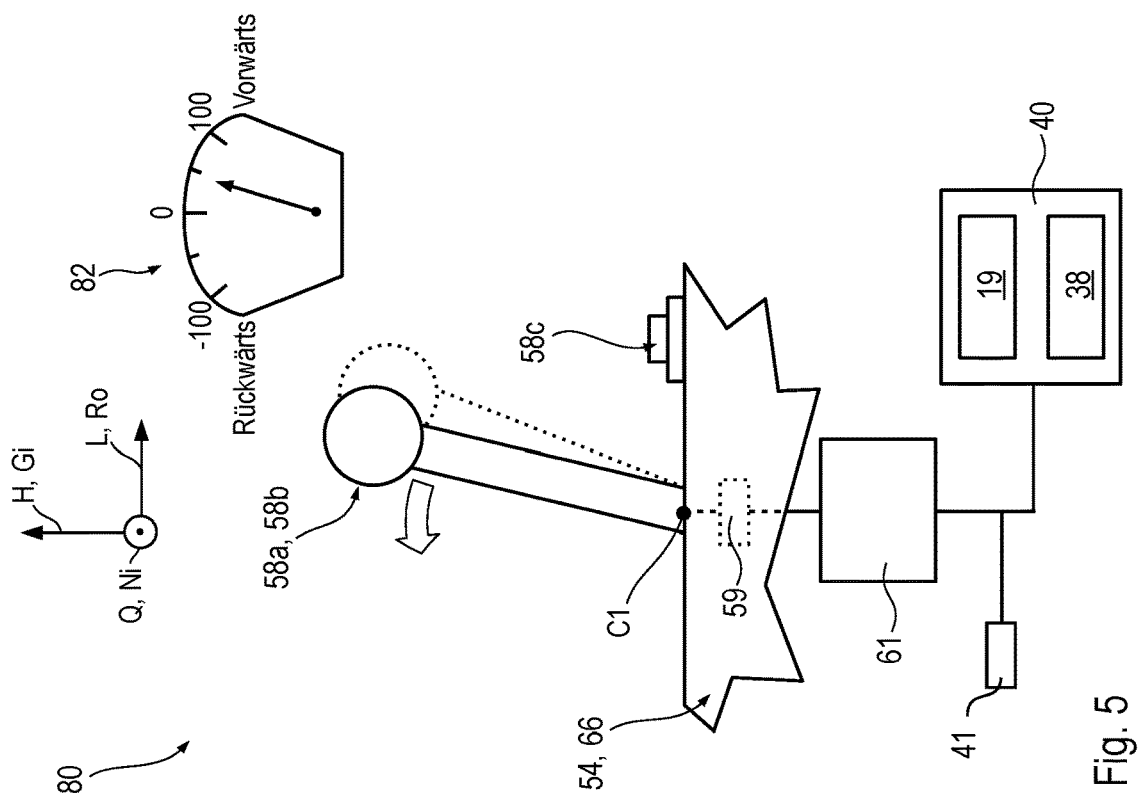
Figure 7:
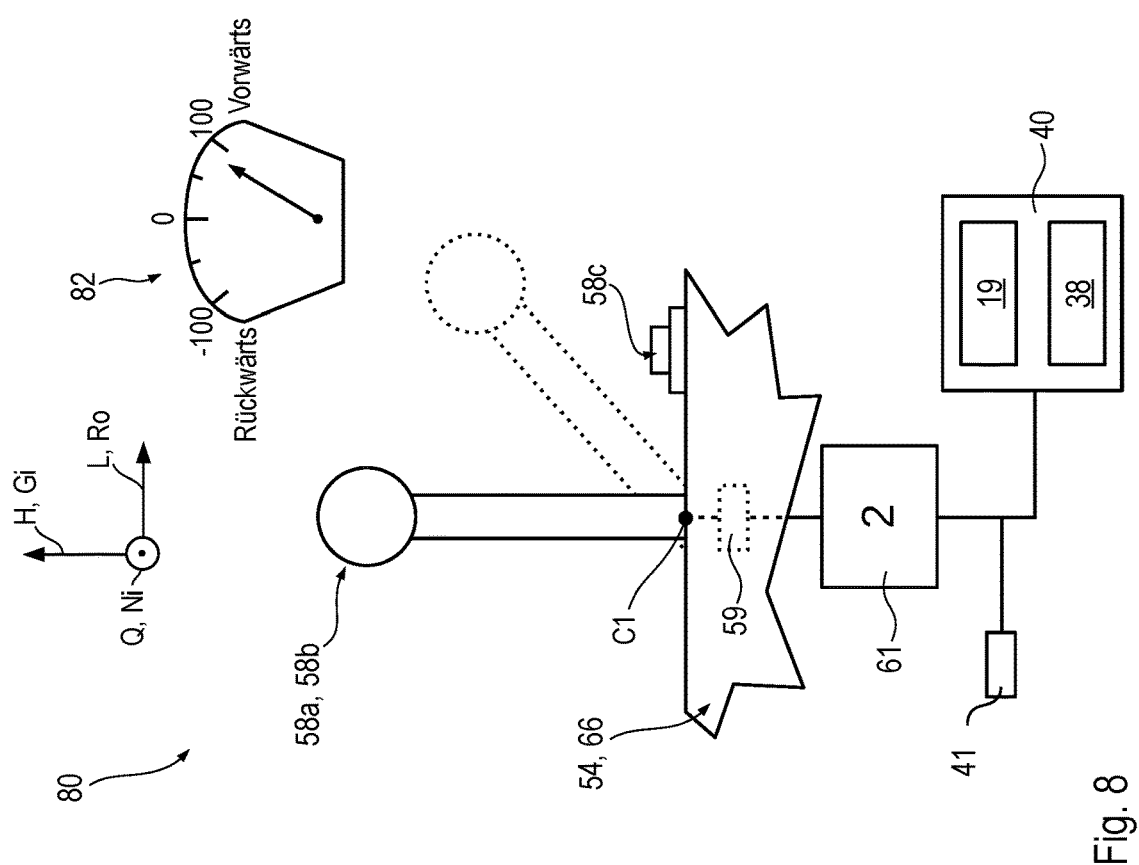

The present disclosure is explained in more detail below with reference to the enclosed figures. The figures show:

FIG. 1 a rough schematic side view of an earth working machine according to a specific embodiment of the present disclosure, FIG. 2 a front view of the operating console of the earth working machine from FIG. 1 with both operating panels in the operating position, FIG. 3 a rough schematic view of an operating apparatus, the joystick of which is in the reference position while the machine is at a standstill, FIG. 4 the operating apparatus from FIG. 3 with a joystick of the operating apparatus deflected in a first operating mode of the controller of the operating apparatus for starting up in the forward travel direction, FIG. 5 the operating apparatus of FIGS. 3 and 4 with retracted deflection of the joystick and termination of the first operating mode effected thereby, FIG. 6 the operating apparatus of FIGS. 3 through 5 with the joystick in the reference position and the controller in the second operating mode, FIG. 7 the operating apparatus of FIGS. 3 through 6 with the controller in the second operating mode and the joystick deflected for travel acceleration in the forward travel direction.

Figure 8:
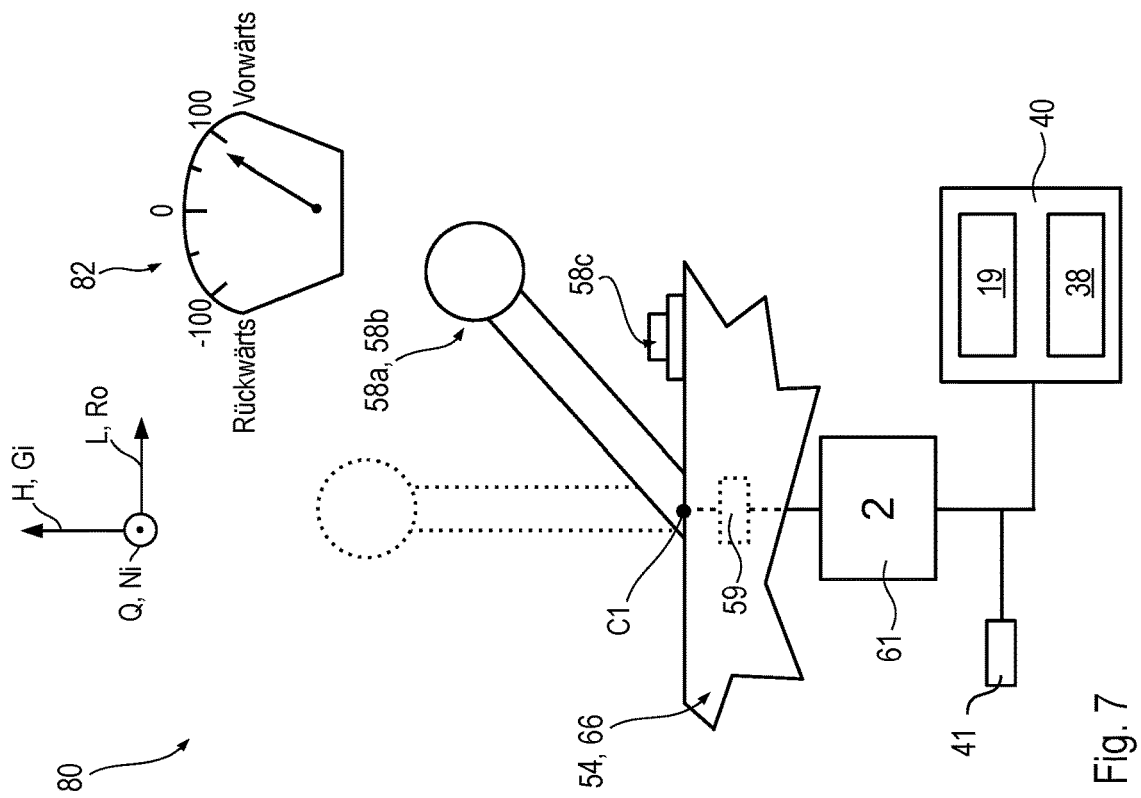
Figure 10:
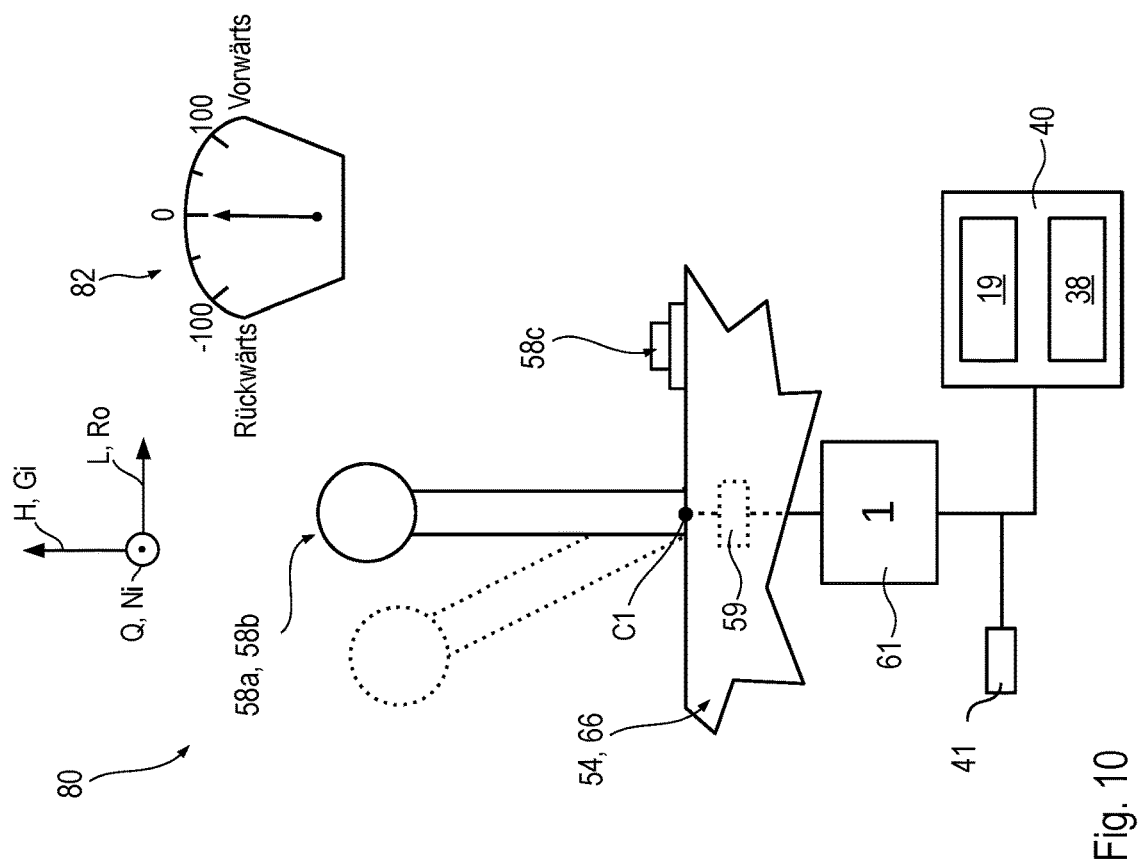
Figure 9:
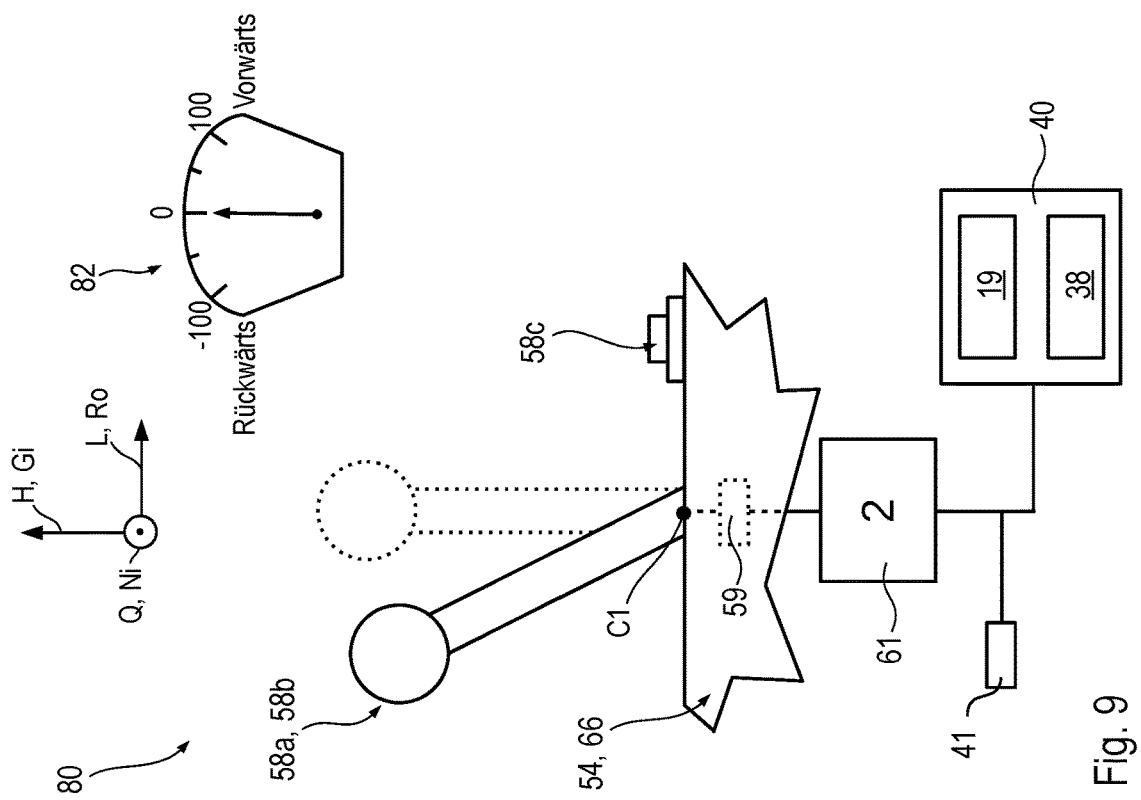
Figure 12:
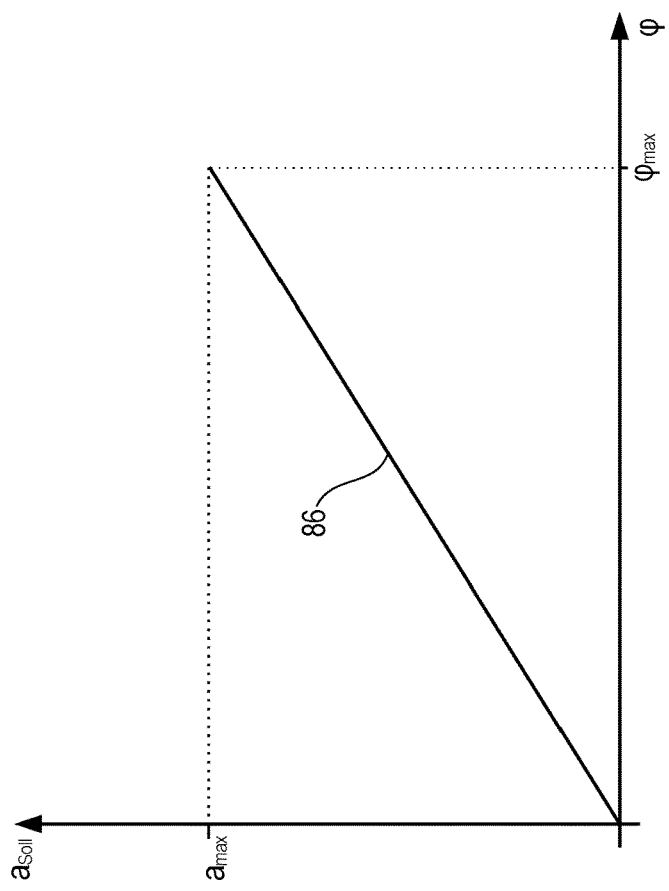
Figure 11:
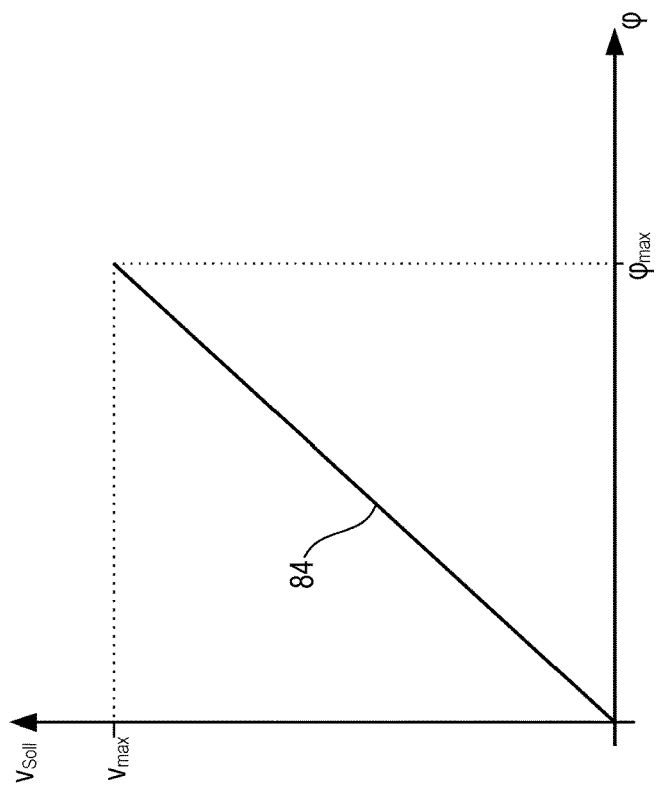
Figure 13:
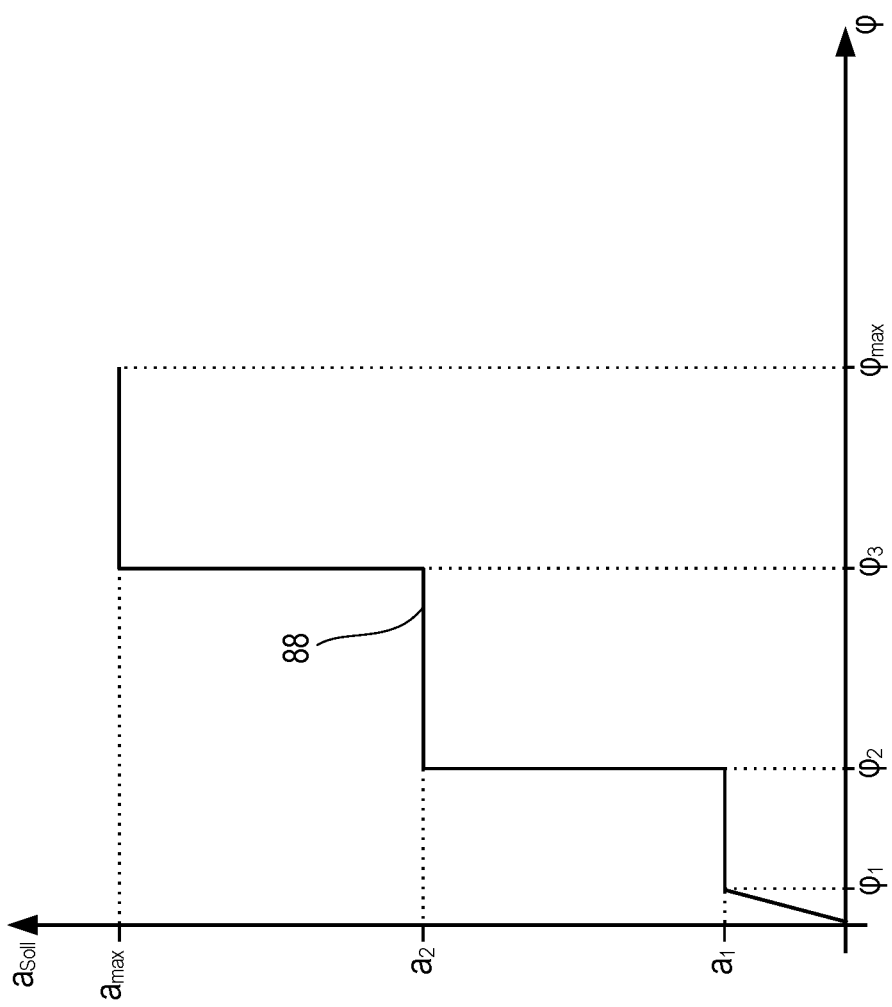

FIG. 8 the operating apparatus of FIGS. 3 through 7 with the joystick in the reference position and the controller in the second operating mode, FIG. 9 the operating apparatus of FIGS. 3 through 8 with the controller in the second operating mode and with the joystick deflected for travel acceleration in the reverse travel direction or for decelerating the forward travel, FIG. 10 the operating apparatus of FIGS. 3 through 9 with the earth working machine decelerated to a standstill and with the joystick in the reference position and the thereby effected changeover of the controller from the second operating mode to the first operating mode, FIG. 11 an exemplary first correlation between the deflection of the joystick and a target speed as a first operating variable, FIG. 12 an exemplary second correlation between the deflection of the joystick and a target acceleration as a second operating variable, and FIG. 13 an exemplary third correlation between the deflection of the joystick and a target acceleration as a second operating variable.

The figures are not true to scale.

DETAILED DESCRIPTION

In FIG. 1, a specific embodiment according to the disclosure of an earth working machine in the form of a large earth or road milling machine is generally indicated by reference numeral 10. It comprises a machine frame 12, which forms the basic framework for a machine body 13. The machine body 13 comprises the machine frame 12 and components of machine 10, which are connected to the machine frame 12 and which are, if indicated, movable relative thereto.

The machine body 13 comprises front lifting columns 14 and rear lifting columns 16, which are connected at one end to the machine frame 12 and at the other end respectively to front drive units 18 and to rear drive units 20 via a respective drive unit connecting structure 34, for example a connecting fork fitting around the drive unit in the transverse machine direction Q, so as to be inclinable about an axis of inclination parallel to the respective axis of rotation of a crawler 21 rotating on drive unit 18 and 20, respectively. Drive units 18 and 20 are of substantially identical construction and constitute the traveling gear 22 of the machine. The distance of the machine frame 12 from the drive units 18 and 20 is variable by way of lifting columns 14 and 16.

It is not apparent in the lateral view of FIG. 1 that machine 10 comprises both in its front end region as well as in its rear end region respectively two lifting columns 14 and 16 each having a drive unit 18 and 20, respectively, connected to it.

The drive units 18 and 20 are illustrated by way of example as crawler drive units having respectively a crawler 21 guided to perform a circulating movement. In a departure therefrom, individual, or all, drive units 18 and/or 20 may also be wheel drive units. Drive units 18 and 20 are motor-driven, normally by a hydraulic motor 19 provided on the respective drive unit itself.

The earth working machine 10 can be driven to move along the directions of travel indicated by the double arrow D.

The viewer of FIG. 1 is looking onto the earth working machine (or simply "machine") 10 in the direction of the transverse direction Q of the machine, which is orthogonal to the drawing plane of FIG. 1. A longitudinal machine direction orthogonal to transverse machine direction Q is labeled L and extends parallel to the drawing plane of FIG. 1. A vertical machine direction H likewise extends in parallel to the drawing plane of FIG. 1 and orthogonally to longitudinal machine direction L and transverse machine direction Q. The arrowhead of longitudinal machine direction L in FIG. 1 points in the forward direction. Vertical machine direction H extends in parallel to the yaw axis Gi of machine 10, longitudinal machine direction L extends in parallel to the roll axis Ro, and transverse machine direction Q extends in parallel to pitch axis Ni.

The earth working machine 10 comprises an operator's platform 24, from which a machine operator is able to control the machine 10 via an operating console 26.

Arranged below machine frame 12 is an earth working apparatus 28, here represented, for example, as a milling assembly having a milling drum 32, accommodated in a milling drum housing 30, that is rotatable about a drum axis R extending in transverse machine direction Q so that substrate material may be removed therewith during an earth working operation, starting from contact surface AO of substrate U to a milling depth determined by the relative vertical position of machine frame 12.

The vertical adjustability of machine frame 12 by way of lifting columns 14 and 16 also serves to set the milling depth, or generally working depth, of machine 10 in the context of earth working. Alternatively or additionally, the milling drum 32 may be accommodated on the machine frame 12 so as to be vertically adjustable relative to the machine frame 12. The earth working machine 10 depicted by way of example is a large milling machine, for which the placement of the milling assembly 28 between the front and rear drive units 18 and 20 in longitudinal machine direction L is typical. Large milling machines of this kind, or indeed earth-removing machines in general, may comprise a transport belt so that removed earth material can be transported away from the machine 10. In the interest of better clarity, a transport belt that is in principle also present in the case of machine 10 is not depicted in FIG. 1.

The driving force source of machine 10 is a combustion engine 36 accommodated on machine frame 12. In the depicted exemplary embodiment, milling drum 32 is driven to rotate by combustion engine 39. The power output of the combustion engine 36 also supplies on machine 10, preferably via a pump transfer gear and a hydraulic pump 38 connected thereto, a hydraulic pressure reservoir, which makes it possible to drive hydraulic motors, in particular the hydraulic motors 19 of the drive units 16 and 18, and hydraulic actuators on machine 10. The combustion engine 36 is thus also the source of the propulsive power of machine 10.

Together with the hydraulic motors 19, the hydraulic pump 38 forms the travel drive 40 of machine 10.

Lifting column 14 and with it drive unit 18 and/or lifting column 16 and with it drive unit 20 are rotatable about a respective steering axis S by way of a steering apparatus (not illustrated further).

The operator's platform 24 is covered by a protective canopy structure 42, which can be raised and lowered by a movement guide 50 and which comprises a protective canopy 44 that is connected to the machine frame 12 or machine body 13 via a front window configuration 46 and a rear wall configuration 48.

FIG. 2 shows the operating console 26, which is constructed substantially in mirror symmetry with respect to a mirror symmetry plane SE parallel to the yaw axis Gi and roll axis Ro, in the front view, that is, from the point of view of a machine operator working on the operator's platform 24. Operating console 26 has a console body 52, a first operating panel 54 and a second operating panel 66. Along movement paths B1 and B2 parallel to the pitch axis Ni, both operating panels 54 and 66 can be entirely inserted into and pulled out of storage compartments 56 and 72 in the console body 52 through respective storage openings 64 and 65, independently of each other according to the mirror-symmetrical design of the operating console 26 relative to the console body 52. The storage openings 64 and 65 can be closed by a respective cover 68 and 70 hinged on the console body 52.

The operating panels 54 and 66 respectively comprise an identical set of operating elements 58. The earth working machine 10 can be operated via the operating elements 58 of each one of the first and second operating panels 54 and 66. The operating elements 58 of the operating panels 54 and 66 respectively comprise a travel lever or joystick 58a and 58b deflectable from a neutral position about a first axis of deflection C1 that is parallel to the pitch axis in the illustrated example. The operating elements 58 may be described as including at least one joystick 58a, 58b. The deflection of either joystick 58a or 58b about its first axis of deflection C1 may be referred to as a deflection in a first direction of deflection parallel to the direction L, or simply as the first direction of deflection L.

A lower portion of the console body 52, which is supported on and fastened to the floor of the operator's platform (not shown in FIG. 2), is designed for example as an electrical cabinet 60 for accommodating electrical circuits. The electrical cabinet may house, among other things, a controller 61 connected in signal-transmitting fashion to the operating elements 58 and in particular to the two travel levers 58a and 58b and to the travel drive 40. Two doors 62 and 63 hinged on the console body 52 close the electrical cabinet 60.

The controller 61 may comprise a processor 61a, a data bus 61b, a data memory 61c and/or a database 61d. The data memory 61c may be a hard disk and/or an SSD memory and/or a USB stick and/or an optically readable data memory and/or at least one EPROM and/or at least one EEPROM and the like.

The controller 61 may be a single controller or may comprise multiple distributed partial controllers, which are connected in signal-transmitting fashion and cooperate as controller 61.

The data memory 61c serves to provide an operating system of the controller 61 and to store and, if indicated, delete data transmitted to the controller 61 in operation.

The processor 61a comprises at least one integrated circuit for processing data of the operating system and data, which are transmitted to the controller 61 in operation, for example from operating elements and sensors.

In addition to the two operating panels 54 and 66, which are movable relative to the console body 52 in translatory fashion, the console body 52 has an additional operating panel 74 situated in stationary fashion on the console body 52 in a central upper region. The additional operating panel 74 may serve as an input device of the controller 61.

The operating console 26 further has a display device 76 developed separately from the operating panels 54 and 66 and separately from the additional operating panel 74. The display device 76, which is an output device 78 of the controller 61, is displaceable on a guide rail 78 along a displacement axis V parallel to the pitch axis Ni and is swivable about displacement axis V.

FIGS. 3 through 10 respectively show an operating apparatus 80 of the earth working machine 10 with its joystick 58a, 58b and its controller 61. In the following, the mode of functioning of the operating apparatus 80 of machine 10 is to be illustrated on the basis of an imaginary actuation sequence for controlling the travel of machine 10.

Each of the FIGS. 3 through 10 additionally shows a symbolic speedometer 82, which indicates the speed of the machine 10 reached at the end of the actuation situation illustrated in the respective figure. To facilitate the illustration, the scale of the symbolic speedometer 82 is a percentage scale, which extends from −100% as the maximum speed in reverse travel to +100% as the maximum speed in forward travel. A mid-position of the speedometer indicates a speed of 0%, that is, standstill of machine 10.

In controller 61, a numeral respectively indicates the current operating mode, which in FIG. 3 is the first operating mode indicated by the numeral "1".

Furthermore, FIGS. 3 through 10 respectively indicate in rough schematic and symbolic fashion that the controller 61 is connected to the travel drive 40 in signal-transmitting fashion in order to control the latter, the travel drive comprising the hydraulic motors 19 of the drive units 18 and 20 as well as the hydraulic pump 38 of the hydraulic circuit of machine 10. The controller 61 detects the direction and magnitude of the deflection of travel lever 58a or 58b, respectively, via a position sensor 59.

Both in the first and in the second operating mode, the controller 61 detects by way of the position sensor 59 a deflection of the joystick 58a, 58b relative to the neutral position shown in FIG. 3, toward which the joystick 58a, 58b is pre-tensioned so that it returns to this neutral position without application of an external force. The neutral position of the joysticks 58a, 58b is therefore their reference position. Joystick 58a, 58b, there being always only one joystick of the joysticks 58a, 58b actuated at a time, is deflectable about the axis of deflection C1 parallel to the transverse machine direction Q for forward travel toward the front end of the machine 10 and for reverse travel toward the rear end of the machine 10.

The joysticks 58a, 58b may be additionally deflectable about a second axis of deflection parallel to the roll axis Ro, in order to produce a steering movement of the steerable drive units 18 and 20. Such a deflection of the joysticks 58a, 58b about the second axis of deflection parallel to the roll axis Ro may be referred to as a deflection of the joystick orthogonal to the first direction of deflection L. In the present exemplary embodiment, however, the travel speed is influenced only by the magnitude of the deflection of the joysticks 58a, 58b about the axis of deflection C1 in the first direction of deflection L, irrespective of any deflection of the joysticks 58a, 58b orthogonal to the first direction of deflection L.

The neutral position of joysticks 58a, 58b in FIG. 3 is indicated by the longitudinal axis L58 of joysticks 58a, 58b within a play compensation range 55 bounded by threshold deflections SF in the direction of forward travel and SR in the direction of reverse travel. The controller 61 preferably controls the travel drive 40 only on the basis of a deflection of one of joysticks 58a, 58b, if the latter, depending on its deflection direction, is deflected from the neutral position beyond the threshold deflection SF or SR. Thus it is possible to neutralize by control engineering both an uncertainty in the detection of the position of the joysticks 58a, 58b due to a clocked query of the position sensor 59 as well as due to a movement play of the joysticks 58a, 58b in the neutral position possibly setting in with increasing operating time. For better clarity, the play compensation range 55 around the neutral position is shown only in FIG. 3.

In the first operating mode, the controller 61 assigns a target travel speed to the magnitude of the deflection of joysticks 58a, 58b and controls the travel drive 40 until the target travel speed indicated by the magnitude of the deflection of a joystick is reached. The direction of the deflection relative to the neutral position indicates the travel direction desired by the machine operator.

In order to avoid an unwanted jerky start of travel, the controller 61 in the first operating mode controls the travel drive 40 to produce a travel acceleration that is greater for higher target travel speeds than for lower target travel speeds. The travel acceleration brought about by the controller 61 by accordingly controlling the travel drive 40 may be proportional to the target travel speed to be reached. Alternatively, different levels of a travel acceleration may be programmed, for example a low, an intermediate and a high travel acceleration, it also being possible for the target speeds to be divided into a corresponding number of gradations, so that in order to reach a target travel speed, which lies at a specific travel speed level, a travel acceleration is selected that corresponds to the travel acceleration associated with the level of the travel speed. In general, it is also possible, however, to accelerate the machine 10 always with the same travel acceleration regardless of the target travel speed selected by deflection of one of joysticks 58a or 58b.

In the present exemplary embodiment, the drive units are driven by hydraulic motors 19, so that for increasing travel acceleration the controller 61 first increasingly actuates the hydraulic pump 38 until the latter reaches its maximum delivery rate. When the maximum delivery rate of the hydraulic pump 38 is attained, the controller 61 for a further speed increase of machine 10 actuates the individual hydraulic motors 19 and decreases their displacement. For decelerating a traveling machine 10, the controller 61 actuates the travel drive 40 in the reverse order and first increases the displacement of the hydraulic motors 19 to the maximum displacement and subsequently reduces the delivery rate of the hydraulic pump 38.

In FIG. 3, the machine 10 is at a standstill and the joysticks 58a, 58b are in their neutral position.

As shown in FIG. 4, starting from the previously assumed neutral position indicated by a dotted line, one of the joysticks 58a or 58b is deflected by a deflection angle φ in a deflection direction corresponding to the forward travel direction, upon which the controller 61 controls the travel drive 40 to produce a travel acceleration of machine 10 until a target travel speed corresponding to the magnitude of the deflection of the deflected joystick 58a or 58b is reached.

The attained local-maximum deflection of the deflected joystick 58a or 58b illustrated in FIG. 4 is again represented by its longitudinal axis L58. A correction range 57 may be defined around the first deflection, which in the direction away from the neutral position is bounded by a threshold deflection CF and in the direction toward the neutral position is bounded by a threshold deflection CR. Within the correction range 57, the machine operator is able to move the deflected joystick 58a or 58b and thereby control the travel drive 40 as a function of the magnitude of the deflection in accordance with the first correlation and of the target speed as the first operating variable. The correction range 57 is preferably greater in magnitude than the play compensation range 55 so as to make it possible to control the travel drive in the first operating mode beyond an uncertainty range in the detection of the position of the deflected joystick 58a or 58b that is caused by a clocked information transmission via the data bus 61b.

Within the correction range 57, the deflected joystick 58a or 58b is deflectable from its attained local-maximum deflection up to the threshold deflection CF in the direction away from the neutral position along a first correction path 1K. Within the correction range 57, the deflected joystick 58a or 58b is deflectable from its attained local-maximum deflection up to the threshold deflection CR in the direction toward the neutral position along a second correction path 2K.

In the example from FIG. 4, the first correction path 1K is shown to be of greater length than the second correction path 2K merely for reasons of illustration. The two paths 1K and 2K may also be of equal length or the second correction path 2K may be longer than the first correction path 1K. One of the two paths or both paths may be zero or may merely have a value that makes it possible to prevent a previously described uncertainty in the detection of the position of the deflected joystick 58*a* or 58*b* from resulting in a control intervention in travel drive 40. If one of the two paths 1K and 2K is zero, then this is preferably the second correction path 2K.

TT illustrates a tolerance path, the exceedance of which in the direction toward the neutral position prompts the controller 61 to end the first operating mode. In a variant of the illustration in FIG. 4, the tolerance path TT may be the entire return path back into the neutral position. The first operating mode is then only ended when the joystick reaches its neutral position.

Speed sensors 41 in each of the drive units 18 and 20, which are indicated merely symbolically in FIG. 1, detect the actual travel speed of machine 10 and report it back to the controller 61. If by comparing the actual travel speed to the target travel speed, the controller 61 ascertains that the target travel speed is reached, then the controller 61 controls the travel drive 40 so as to maintain the attained travel speed.

The symbolic speedometer 82 in FIG. 4 indicates that the target travel speed input into the controller 61 by the magnitude of the deflection of the joystick 58*a* or 58*b* is reached.

After reaching the input target travel speed, the machine operator releases the deflected joystick 58*a* or 58*b* so that the latter begins to return to the neutral position on account of its being pre-tensioned. This situation is shown in FIG. 5. The starting position of the deflected joystick 58*a* or 58*b*, that is, its position in FIG. 4, is shown in FIG. 5 by a dotted line. The deflected joystick 58*a* or 58*b* is moving toward the neutral position, driven by being pre-tensioned accordingly.

As soon as the magnitude of the deflection of the deflected joystick 58*a* or 58*b* in the first operating mode has reached or exceeded the tolerance path TT, the controller 61 ends the first operating mode.

In the illustrated exemplary embodiment, the deflected joystick 58*a* or 58*b* does not cause a control intervention in travel drive 40 while it returns to the neutral position in spite of the objective deflection from the neutral position, and the travel speed reached in the first operating mode is maintained.

After reaching the neutral position, or, if applicable, after an intentional reversal of the direction of movement of the deflected joystick 58*a* or 58*b* counter to its pre-tension direction, the controller 61 now assigns, in the second operating mode, a target travel acceleration to the magnitude of the deflection of the joystick 58*a*, 58*b*. An assignment of the magnitude of the deflection to a target travel speed as in the first operating mode does not occur in the second operating mode.

The assignments of magnitude of deflection and target travel speed and target travel acceleration may be stored for example in the data memory 61*c* of the controller 61 as a characteristics map, a characteristic curve, a function, table and the like.

In the second operating mode, when one of the joysticks 58*a* or 58*b* is deflected, the machine 10 is accelerated by a corresponding activation of the travel drive 40 by the controller 61 until the machine operator releases the deflected joystick 58*a* or 58*b* or until a predetermined maximum travel speed is reached, which is preferably likewise stored in the data memory 61*c* of the controller 61. A travel acceleration in the travel direction increases the travel speed. A travel acceleration counter to the current travel direction acts as a deceleration and reduces the travel speed. As in the first operating mode, the direction of the deflection of the joysticks 58*a*, 58*b* indicates to the controller 61 the desired effective direction of the target travel acceleration.

In FIG. 6, the joystick 58*a* or 58*b* has reached the neutral position. The machine 10 continues to move at the travel speed reached through the deflection of the joystick 58*a* or 58*b* in the first operating mode. For comparison, FIG. 6 shows by a dotted line the earlier position of the deflected joystick 58*a* or 58*b* shown in FIG. 5.

In FIG. 7, the machine operator has now deflected the joystick 58*a* or 58*b* again in the forward travel direction, but now in the second operating mode. The magnitude of the deflection is greater than previously in the first operating mode. The machine 10 is accelerated at the travel acceleration or setting of the travel drive 40 in the forward travel direction assigned to the magnitude of the deflection in the controller 61 for as long as the machine operator holds the joystick 58*a* or 58*b* in the deflected position of FIG. 7 or until a preset or machine-inherent maximum speed is reached. The symbolic speedometer 82 indicates that after a certain duration of the deflection an increased travel speed of the machine 10 is reached.

Upon reaching the desired travel speed, the machine operator releases the joystick 58*a* or 58*b*, so that the latter returns to the neutral position shown in FIG. 8. For comparison, FIG. 8 shows by a dotted line the previous position of the joystick 58*a* or 58*b* from FIG. 7. The machine 10 now continues to move at the attained travel speed in forward travel for as long as the joysticks 58*a* or 58*b* remain in their neutral position.

FIG. 9 shows that in order to brake the machine 10, the machine operator has deflected the joystick 58*a* or 58*b* in the second operating mode in the reverse travel direction, so that the controller 61 decelerates the travel drive 40 in accordance with the magnitude of deflection of the deflected joystick 58*a* or 58*b*. The deceleration in accordance with the magnitude of the deflection continues for the duration in which the machine operator holds the deflected joystick 58*a* or 58*b* in the reverse direction assigned counter to the current travel direction.

The controller 61 is programmed in such a way that in spite of a continued deflection of the joystick 58*a* or 58*b* it does not continue travel beyond a standstill of the machine, that is, a travel speed of zero, but rather sets the travel drive to be ineffective once a travel speed of zero is reached, so that the machine 10 stands still until a new travel command is input via one of the joysticks 58*a* or 58*b*. This situation is shown in FIG. 9, since the symbolic speedometer 82 already indicates the standstill of the machine 10. FIG. 9 shows by a dotted line the previous position of the deflected joystick 58*a* or 58*b* from FIG. 8.

In FIG. 10, the machine operator has released the previously deflected joystick 58*a* or 58*b*, so that the latter returned to its neutral position due to its being pre-tensioned. By the attainment of the neutral position while the machine 10 is at the same time at a standstill, the controller 61 automatically reverts to the first operating state, so that the next start of travel, whatever the travel direction, of machine 10 will again occur in the first operating mode.

For a maneuvering operation, a separate changeover switch 58*c*, which is shown as a push button merely by way of example, may be used to activate the first or the second operating mode in the controller 61 for the duration and to keep it activated until the changeover switch 58*c* is actuated again. The changeover switch 58*c* is present on both operating panels 54 and 66. In place of the changeover switch 58c, shown here merely by way of example, an operating mode selector switch system may be implemented on a touchscreen physically or as a screen display.

FIG. 11 shows, by way of example, a first correlation 84 between the deflection of the joystick 58a or 58b, represented by the deflection angle q (see FIG. 4), and a first operating variable of the travel drive 40, represented by the travel speed v, in particular the target travel speed $V_{target}$.

The first correlation 84 is linear and links the deflection range of the joystick 58a or 58b from a deflection of 0 up to a maximum possible deflection angle $Q_{max}$ and the speed range of the travel drive 40 from standstill with a speed of 0 up to a preset maximum attainable top speed $V_{max}$. The first correlation 84 is not necessarily linear, but may be progressive or degressive.

According to the first correlation 84, the travel drive 40 is controlled in the above exemplary embodiment in the first operating mode in accordance with the target travel speed $V_{target}$.

FIG. 12 shows, by way of example, a second correlation 86 between the deflection of the joystick 58a or 58b, again represented by the deflection angle φ, and a second operating variable of the travel drive 40, represented by the travel acceleration a, in particular the target travel acceleration $a_{target}$.

The second correlation 86 is linear and links the deflection range of the joystick 58a or 58b from a deflection of 0 up to a maximum possible deflection angle φ max and the acceleration range of the travel drive 40 from an acceleration of 0 up to a preset maximum attainable acceleration $a_{max}$. The second correlation 86 is not necessarily linear, but may be progressive or degressive.

According to the second correlation 86, the travel drive 40 is controlled in the above exemplary embodiment in the second operating mode in accordance with the target travel acceleration $a_{target}$.

FIG. 13 shows, by way of example, a third correlation 88 between the deflection of the joystick 58a or 58b, again represented by the deflection angle q, and the second operating variable of the travel drive 40, represented by the travel acceleration a, in particular the target travel acceleration $a_{target}$.

The third correlation 88 is a combination of a linear and a tiered correlation and links the deflection range of the joystick 58a or 58b from a deflection of 0 up to a maximum possible deflection angle φ max and the acceleration range of the travel drive 40 from an acceleration of 0 up to a preset maximum attainable acceleration $a_{max}$. The third correlation 88 may have a characteristic curve different from the one in FIG. 13.

In the first operating mode, the travel drive 40 in the above exemplary embodiment may be controlled according to the third correlation 88 in accordance with a target travel acceleration $a_{target}$. Since a target speed as the first operating variable, which deviates from an actual speed, cannot be reached without an acceleration, the third data correlation prescribes at what acceleration the target speed respectively indicated by the deflection of the joystick 58a or 58b is to be reached. The third data correlation is based on the idea that higher target speeds are to be reached with greater accelerations and lower target speeds are to be reached with lesser accelerations.

In the reference state or in the neutral position, in which the target speed to be reached is 0, the target acceleration is 0 as well. Up to a first small deflection $\varphi_1$ of the joystick 58a or 58b, the target acceleration to be applied increases up to a predetermined acceleration $a_1$ in linear fashion with the deflection φ of the joystick 58a or 58b.

After the deflection $\varphi_1$ of the joystick 58a or 58b has been reached, in a lower deflection zone of the joystick 58a or 58b extending from deflection $\varphi_1$ up to deflection φ2, the acceleration $a_1$ continues to be applied. In an intermediate deflection zone of the joystick 58a or 58b extending from deflection $\varphi_2$ up to deflection $\varphi_3$, the greater acceleration $a_2$ is applied. In an upper deflection zone of the joystick 58a or 58b extending from deflection $\varphi_3$ up to deflection $Q_{max}$, the maximum possible acceleration $a_{max}$ is applied.

In order to avoid incorrect operation of the joystick 58a or 58b, preferably only one switching gate and particularly preferably no switching gate is provided for the joystick 58a or 58b in the direction of a movement or actuation which causes a change in travel speed in the forward travel or reverse travel direction. A joystick 58a or 58b without a switching gate can advantageously be deflected both independently of the active operating mode and independently of its deflection along the direction of movement to change the travel speed orthogonally to the direction of movement in order to change the direction of travel, as already described above.

Preferably, this applies to each joystick 58a or 58b of the earth working machine 10, which interacts with the controller 61 in order to control the travel drive in accordance with the detected deflection of one of the two joysticks 58a or 58b to change the travel speed.

The invention claimed is:

1. A self-propelled earth working machine, comprising:
   a machine frame;
   an earth working apparatus supported by the machine frame;
   a traveling gear supporting the machine frame;
   a travel drive for driving the earth working machine to perform a travel movement in a moving direction; and
   an operating apparatus for controlling the travel drive, wherein the operating apparatus includes at least one joystick deflectable from a reference position and a controller;
   wherein the controller is configured to detect a deflection angle of the joystick in a first direction of deflection about a first axis of deflection with respect to the reference position and to control the travel drive in accordance with the detected deflection angle in the first direction of deflection irrespective of any deflection of the joystick orthogonal to the first direction of deflection in order to produce a travel movement;
   wherein the controller is switchable between a first operating mode, in which the controller assigns a value of a first movement variable to the deflection angle of the joystick according to a first correlation and controls the travel drive in accordance with the first movement variable, and a second operating mode, in which the controller assigns a value of a second movement variable differing from the first movement variable to the deflection angle of the joystick according to a second correlation and controls the travel drive in accordance with the second movement variable; and
   wherein the controller in the second operating mode does not control the travel drive according to the first correlation in accordance with the first movement variable.

2. The self-propelled earth working machine as recited in claim 1, wherein:
   the first movement variable comprises or is a target speed of the earth working machine.

3. The self-propelled earth working machine as recited in claim 1, wherein:
the second movement variable comprises or is a target travel acceleration or an operating variable of the earth working machine that stands in a causal relationship with the travel acceleration of the earth working machine.

4. The self-propelled earth working machine as recited in claim 1, wherein:
the controller in the first operating mode is configured to assign to the deflection angle of the joystick a value of the second movement variable according to a third correlation and to control the travel drive also in accordance with the second movement variable.

5. The self-propelled earth working machine as recited in claim 4, wherein the third correlation is the second correlation.

6. The self-propelled earth working machine as recited in claim 1, wherein:
the controller is configured to end the first operating mode as a function of an actuation state of the joystick by a movement of the joystick and/or as a function of an actuation state of the joystick to begin controlling the travel drive in the second operating mode by a movement of the joystick.

7. The self-propelled earth working machine as recited in claim 6, wherein:
the controller is configured to end the first operating mode in response to a movement of the joystick changing the deflection angle of the joystick.

8. The self-propelled earth working machine as recited in claim 7, wherein:
the controller is configured to end the first operating mode when an already reached deflection angle of the joystick is reduced in magnitude.

9. The self-propelled earth working machine as recited in claim 1, wherein:
the joystick has a neutral position, wherein the controller is configured to control the travel drive neither in an accelerating nor in a decelerating manner as long as the joystick is in the neutral position.

10. The self-propelled earth working machine as recited in claim 9, wherein the neutral position is the reference position.

11. The self-propelled earth working machine as recited in claim 9, wherein:
the controller is configured to end the second operating mode as a function of a travel state of the earth working machine and as a function of an actuation position of the joystick and/or to begin controlling the travel drive in the first operating mode as a function of the travel state of the earth working machine and as a function of the actuation position of the joystick.

12. The self-propelled earth working machine as recited in claim 11, wherein:
the controller is configured to end the second operating mode when the earth working machine has a travel speed that is not higher than a predetermined threshold speed and the joystick is in the neutral position.

13. The self-propelled earth working machine as recited in claim 1, wherein:
the at least one joystick comprises at least two joysticks respectively deflectable from a reference position, which are situated at a spatial distance from one another, wherein each joystick cooperates with the controller in order to control the travel drive in accordance with the detected deflection angle of one of the two joysticks so as to produce a travel movement.

14. The self-propelled earth working machine as recited in claim 1, wherein:
the controller is configured to select the first and/or the second operating mode as an active operating mode independently of an operating state of the earth working apparatus.

15. The self-propelled earth working machine as recited in claim 1, wherein:
the self-propelled earth working machine is a road milling machine or a recycler or a surface miner.

16. The self-propelled earth working machine as recited in claim 1, wherein:
the controller is configured to steer the self-propelled earth working machine in response to deflection of the joystick orthogonal to the first direction of deflection.

17. The self-propelled earth working machine as recited in claim 1, wherein:
the controller is configured to automatically select the first or second operating mode according to objective criteria without intentional selection of the operating mode by an operator of the self-propelled earth working machine.

* * * * *

UNITED STATES PATENT AND TRADEMARK OFFICE
CERTIFICATE OF CORRECTION

PATENT NO. : 12,404,657 B2
APPLICATION NO. : 18/594055
DATED : September 2, 2025
INVENTOR(S) : Marc Ridder Page 1 of 1

It is certified that error appears in the above-identified patent and that said Letters Patent is hereby corrected as shown below:

In the Specification

Column 21, Line 6 - replace the "q" with the -- φ --

Column 21, Line 11 - replace the "Qmax" with the -- φmax --

Column 21, Line 40 - replace the "q" with the -- φ --

Signed and Sealed this
Twenty-eighth Day of October, 2025

John A. Squires
*Director of the United States Patent and Trademark Office*